US008787461B2

(12) United States Patent
Kuo et al.

(10) Patent No.: US 8,787,461 B2
(45) Date of Patent: Jul. 22, 2014

(54) HIGH-PERFORMANCE BLOCK-MATCHING VLSI ARCHITECTURE WITH LOW MEMORY BANDWIDTH FOR POWER-EFFICIENT MULTIMEDIA DEVICES

(75) Inventors: Sy-Yen Kuo, Taipei (TW); Shih-Chia Huang, Taipei (TW)

(73) Assignee: National Taiwan University, Taipei (TW)

( * ) Notice: Subject to any disclaimer, the term of this patent is extended or adjusted under 35 U.S.C. 154(b) by 1085 days.

(21) Appl. No.: 12/344,521

(22) Filed: Dec. 28, 2008

(65) Prior Publication Data
US 2010/0091862 A1  Apr. 15, 2010

(30) Foreign Application Priority Data

Oct. 14, 2008  (TW) .............................. 97139373 A

(51) Int. Cl.
*H04N 7/26* (2006.01)
*H04N 7/36* (2006.01)
(52) U.S. Cl.
CPC ... *H04N 19/00587* (2013.01); *H04N 19/00509* (2013.01); *H04N 19/00606* (2013.01); *H04N 19/00715* (2013.01)
USPC ................................. 375/240.16; 375/240.17
(58) Field of Classification Search
CPC .................. H04N 19/00587; H04N 19/00509; H04N 19/00606; H04N 19/00715
USPC ...................... 375/270.16, 17, 240.16, 240.17
See application file for complete search history.

(56) References Cited

U.S. PATENT DOCUMENTS

| | | | | |
|---|---|---|---|---|
| 4,661,849 A * | 4/1987 | Hinman | ................... | 375/240.16 |
| 5,134,480 A * | 7/1992 | Wang et al. | ................... | 348/620 |
| 6,724,823 B2 * | 4/2004 | Rovati et al. | ............. | 375/240.17 |
| 6,914,938 B2 * | 7/2005 | Zhang et al. | ............. | 375/240.16 |
| 7,023,923 B2 * | 4/2006 | Turaga et al. | ............. | 375/240.19 |
| 7,940,844 B2 * | 5/2011 | Lai et al. | ................... | 375/240.16 |
| 2005/0013368 A1 * | 1/2005 | Gallant et al. | ........... | 375/240.16 |
| 2006/0120455 A1 * | 6/2006 | Park et al. | ................ | 375/240.16 |
| 2006/0198445 A1 * | 9/2006 | Li et al. | ..................... | 375/240.17 |
| 2008/0260033 A1 * | 10/2008 | Austerlitz et al. | ........ | 375/240.16 |

OTHER PUBLICATIONS

Single Reference Frame Multiple Current Macroblocks Scheme for Multiple Reference Frame Motion Estimation in H.264/AVC; Tung-Chien Chen, Chuan-Yung Tsai, Yu-Wen Huang, and Liang-Gee Chen; IEEE Transactions on Circuits and Systems for Video Technology, vol. 17, No. 2, Feb. 2007.*
Fast and Accurate Motion Estimation Algorithm by Adaptive Search Range and Shape Selection; Yamada et al.; IEEE; ICASSP 2005.*
Neighbourhood-blocks motion vector estimation technique using pyramidal data structure; Zab et al.; Jun. 2002.*

(Continued)

*Primary Examiner* — Bradley Holder
*Assistant Examiner* — James Turchen
(74) *Attorney, Agent, or Firm* — Jianq Chyun IP Office

(57) ABSTRACT

A high-performance block-matching VLSI architecture with low memory bandwidth for power-efficient multimedia devices is disclosed. The architecture uses several current blocks with the same spatial address in different current frames to search the best matched blocks in the search window of the reference frame based on the best matching algorithm (BMA) to implement the process of motion estimation in video coding. The scheme of the architecture using several current blocks for one search window greatly increases data reuse, accelerates the process of motion estimation, and reduces the data bandwidth and the power consumption.

10 Claims, 9 Drawing Sheets

(56) References Cited

OTHER PUBLICATIONS

S. Soongsathitanon, et al., "Fast Search Algorithms for Video Coding Using Orthogonal Logarithmic Search Algorithm", IEEE Trans. on Consumer Electronics, vol. 51, No. 2, May 2005, pp. 552-559.

Esam A. Al Qaralleh, et al., "Fast Variable Size Motion Estimation by Adaptive Early Termination", IEEE Trans. on Circuits and Systems for Video Technology, vol. 16, No. 8, Aug. 2006, pp. 1021-1026.

Tung-Chien Chen, et al., "Single Reference Frame Multiple Current Macroblocks Scheme for Multiple Reference Frame Motion Estimation in H.264/AVC", IEEE Trans. on Circuits and Systems for Video Technology, vol. 17, No. 2, Feb. 2007, pp. 242-247.

Chen et al., "Single Reference Frame Multiple Current Macroblocks Scheme for Multi-Frame Motion Estimation in H.264/AVC," Circuits and Systems, ISCAS. IEEE International Symposium, vol. 2, May 23-26, 2005, pp. 1790-1793.

Gallant, M. et al., "An Efficient Computation-Constrained Block-Based Motion Estimation Algorithm for Low Bit Rate Video Coding," Signals, Systems & Computers, Conference Record of the Thirty-Second Asilomar Conference, vol. 1, Nov. 1-4, 1998, pp. 467-471.

"Office Action of Taiwan Counterpart Application", issued on Dec. 17, 2012, p. 1-p. 9.

* cited by examiner

HIGH-PERFORMANCE BLOCK-MATCHING VLSI ARCHITECTURE WITH LOW MEMORY BANDWIDTH FOR POWER-EFFICIENT MULTIMEDIA DEVICES

BACKGROUND OF THE INVENTION

1. Field of the Invention

The present invention relates generally to a video coding technology, and more particularly to a block matching method for fast motion estimation.

2. The Prior Arts

In order to save the storage medium space for storing image data and reduce the bandwidth used for transmitting the image data, original image data is often compressed to obtain compressed image data. When the image data is to be displayed, the compressed image data is recovered to displayable image data by executing a decompression process. The compression process is known as a coding process, while the decompression process is known as a decoding process.

The H.264/AVC video coding standard is a widely used coding method, which is often applied in image compression required by network image transmission. The image data coding system of the H.264/AVC standard includes motion estimation, motion compensation, block codes, and variable length codes, by which P-frame bitstream, i.e., the compressed data, can be generated. Among the foregoing, the motion estimation occupies very much system resources, such as memory space, computation time, and power consumption. Generally speaking, the motion estimation may occupy 76% of memory access, 77% of memory bandwidth, and 78% of computation time. As such, it is very highly desired to enhance the efficiency of the motion estimation and improve the entire coding efficiency.

Regarding a motion estimation approach, a search window is selected from a reference frame according to a current block in a current frame. Then, a best matching algorithm (BMA) is utilized to find out a best matched block from all reference blocks in the search window, thus obtaining a corresponding motion vector provided for subsequent variable length codes. The BMA typically determines a best matched block having a minimum sum of absolute differences (SAD) according to the SAD defined by the following equation.

$$SAD(i, j) = \sum_{m=0}^{15} \sum_{n=0}^{15} |X(m, n) - Y(m+i, n+j)|$$

In the equation, $X(m, n)$ represents the image data of the current block at coordinates $(m,n)$, $Y(m+i, n+j)$ represents the image data of the reference block at coordinates $(m+i, n+j)$, in which i is a horizontal coordinate, and j is a vertical coordinate, and i and j are integers.

FIG. 1 is a schematic diagram illustrating a conventional video coding hardware system. Referring to FIG. 1, a conventional video coding hardware system 1 includes an encoder 10, for searching for a best matched block in the search window of the reference frame. The encoder 10 loads data stored in an external memory 17 via an external bus 19 and a memory interface 16. The data stored in the external memory 17 is the data of the reference block in the search window. The encoder 10 includes an encoding engine 11, an internal memory 12, and a computation engine 13. The internal memory is adapted for storing the data loaded from the external memory 17. The computation engine 13 executes a logical computation to obtain the SADs. The encoding engine 11 finds out the best matched block having the minimum SAD according to the SADs obtained by the computation engine 13.

Referring to FIG. 2, there is shown a schematic diagram illustrating the search window of the conventional BMA. As shown in FIG. 2, the search window 50 has a width of $SR_H+N-1$, a height $SR_V+N-1$, a horizontal searching range $SR_H$, and a vertical searching range $SR_V$. A reference block 61 positioned at a center point of the search window 50 is a N×N block, in which each of the values is counted by pixel as the unit thereof, and $SR_H=2P_H$, and $SR_V=2P_V$.

The H.264/AVC video coding standard is featured with the fast motion estimation approach of a specific multiple reference frames scheme, for providing a standard operation for further compression of the image data.

Referring to FIG. 3, there is shown a conventional multiple reference frames scheme. As shown in FIG. 3, regarding a current block 30 of the current frame 20, according to the BMA, best matched blocks are found out from a first search window 51, a second search window 52, a third search window 53, and a fourth search window 54 of a first reference frame 41, a second reference frame 42, a third reference frame 43, and a fourth reference frame 44, respectively. The current block 30 is at a time t, the first search window is at a time t−T, the second search window is at a time t−2T, the third search window is at a time t−3T, and the fourth search window is at a time t−4T, in which T is a frame time interval, i.e., a spacing time between two consecutive frames. The time t−4T is ahead to the time t−3T for a frame time interval T.

Referring to FIG. 4, there is shown a flow chart illustrating the conventional multiple reference frames scheme. As shown in FIG. 4, first at step S10, the current block is loaded. Then at step S12, the search windows of a reference frame are loaded. Then, at step S14, the best matched blocks of the search windows are searched according to the BMA. Then, at step S16, when the best matched blocks of the search windows of the reference frame are not all obtained yet, the flow goes to step S18. At step S18, search windows of a next reference frame are loaded, and the flow then goes back to step S14. At step S20, the flow ends.

It should be noted that the operation of loading the search windows of the reference frame at steps S12 and S18 means loading all data of the search windows into the internal memory 12 from the external memory 17. At step S14, the best matched blocks are found out according to the BMA. Therefore, the flow shown in FIG. 4 can complete the motion estimation of the current block. The entire motion estimation can be achieved by repeating the foregoing steps regarding all current blocks in the current frame. Steps S12 and S18 unfortunately increase the bandwidth for data transmission. Particularly, in this circumstance, in order to complete the motion estimation of a single current block, all of the first search window 51, the second search window 52, the third search window 53, and the fourth search window 54 have to be downloaded, so that more data have to be transmitted via the external bus 19, thus consuming more power. This seriously affects the performance of the electronic product, especially those using batteries for power supplying.

As such, a high-performance block-matching VLSI architecture with low memory bandwidth is high desired.

SUMMARY OF THE INVENTION

A primary objective of the present invention is to provide a high-performance block-matching VLSI architecture with low memory bandwidth for a power-efficient multimedia device. According to the present invention, a plurality of current blocks having a same spatial current block address in a plurality of current frames share a same predicting search path for searching for corresponding best matched blocks in the search window of reference frames. In such a way, motion vectors of the current blocks relative to the corresponding best matched blocks can be obtained, and thus the motion estimation of the video codes can be achieved. Meanwhile, the frequency of downloading the data of the search windows can be drastically reduced, and the data bandwidth can be reduced, so that the entire motion estimation can be accelerated.

The present invention further provides a block-matching method. According to the block-matching method of the embodiment of the present invention, motion vectors, adaptive search ranges, and a search path of adjacent blocks of the current block are obtained from the related data of the H.264/AVC video coding standard, for predicting a motion vector, an adaptive search range, and a search path of the current block. According to the predicted motion vector, the adaptive search range, the current search pattern, and the search path of the adjacent blocks of the current block, the search path of the current block are predicted. Data designated by the predicated search path are loaded from the external memory into the internal memory. A BMA process is executed and the predicated search path is updated at the same time, thus allowing other current blocks sharing the predicated search path. In such a way, the memory bandwidth and required internal memory capacity are drastically reduced.

Therefore, the block-matching VLSI architecture and the block-matching method provided by the present invention are adapted for providing a solution for solving all disadvantages of the conventional technologies, reducing the data bandwidth, accelerating the motion estimation, and improving the overall efficiency of the video coding process.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 5:
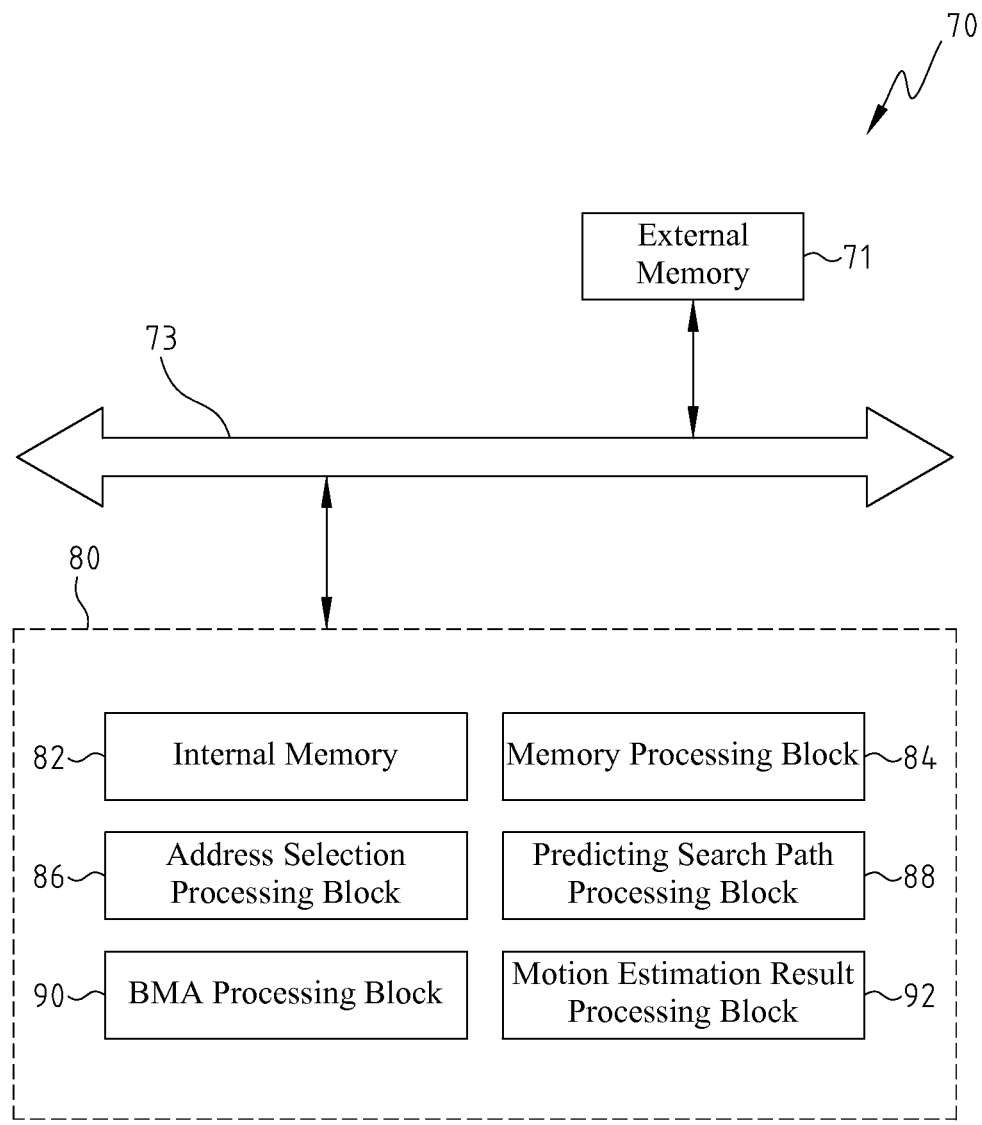
FIG. 5 is a schematic diagram illustrating a high-performance block-matching VLSI architecture according to an embodiment of the present invention.

FIG. 5 is a schematic diagram illustrating a high-performance block-matching VLSI architecture according to an embodiment of the present invention. Referring to FIG. 5, the present invention provides a high-performance block-matching VLSI architecture. The high-performance block-matching VLSI architecture includes a block-matching circuit architecture 70. The block-matching circuit architecture 70 includes an external memory 71, a data bus 73, and a motion estimation processor 80. The external memory 71 includes data of a plurality of reference frames and a plurality of current frames saved therein. The data bus 73 is connected with the external memory 71 and the motion estimation processor 80. The motion estimation processor 80 includes an internal memory 82, a memory processing block 84, an address selection processing block 86, a predicting search path processing block 88, a BMA processing block 90, and a motion estimation result processing block 92. The memory processing block 84 is adapted for controlling a data access operation between the internal memory 82 and the external memory 71. The address selection processing block 86 is adapted for selecting a current block address in a current frame. The predicting search path processing block 88 is adapted for executing a prediction of a search path regarding the current block according to the current block address selected by the address selection processing block 86, so as to predict the search path corresponding to the current block in the search window. The BMA processing block 90 is adapted for loading corresponding data of the search window from the external memory 71 to the internal memory 82, and finding out the best matched blocks by the BMA, according to the search path predicted by the predicting search path processing block 88. In such a way, the motion estimation of a single current block is completed, and motion vectors of the current block and the best matched block are obtained, and recorded by the motion estimation result processing block 92.

Further, the memory processing block 84 loads a current block of another frame having the same current block address. The current block of the current frame is saved in the external memory 71. The predicated search path is updated by the predicting search path processing block 88, and the best matched block and the motion vector are found out by the BMA processing block 90. Meanwhile, the motion estimation result processing block 92 records the motion vector, until motion estimations of all current blocks having the same current block address are completed. Therefore, the data of the same search window can be shared by a plurality of current blocks, for improving the utilization efficiency of the data, and reducing the data bandwidth of the data bus 73.

Then, the motion estimation result processing block 92 restarts the address selection processing block 86 to select another address, and updates the predicted search path by the memory processing block 84 and the predicting search path processing block 88. The BMA processing block 90 finds out the best matched block and the motion vector. Meanwhile, the motion estimation result processing block 92 records the motion vector, until motion estimations of all current blocks having the same current block address are completed. Therefore, the block-matching circuit architecture 70 of the present invention is adapted for carrying out the motion estimation of the H.264/AVC video coding standard data.

Figure 6:
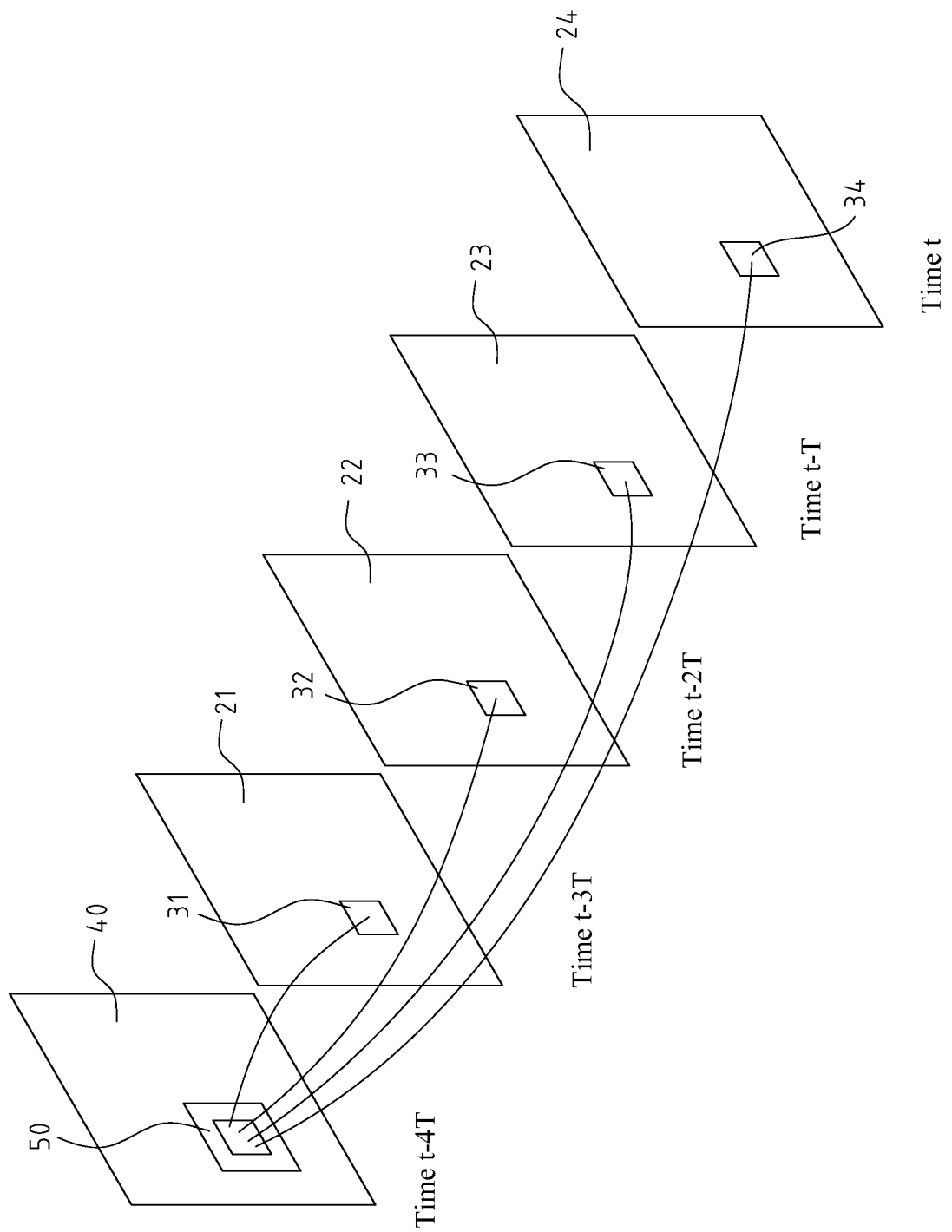
FIG. 6 is a schematic diagram illustrating the block-matching of the high-performance block-matching VLSI architecture according to an embodiment of the present invention.

FIG. 6 is a schematic diagram illustrating the block-matching of the high-performance block-matching VLSI architecture according to an embodiment of the present invention. Referring to FIG. 6, a search window 50 of a reference frame 40 of a time t−4T is a first current block 31 of a first current frame 21 provided for a time t−3T, a second current block 32 of a second current frame 22 provided for a time t−2T, a third current block 33 of a third current frame 23 provided for a time t−T, and a fourth current block 34 of a fourth current frame 24 provided for a time t, for carrying out the motion estimation to find out the best matched blocks. The first current block 31, the second current block 32, the third current block 33, and the fourth current block 34 are positioned at a same spatial address of different current frames. As such, the first current block 31, the second current block 32, the third current block 33, and the fourth current block 34 are highly time correlated in a time axis.

Figure 1:
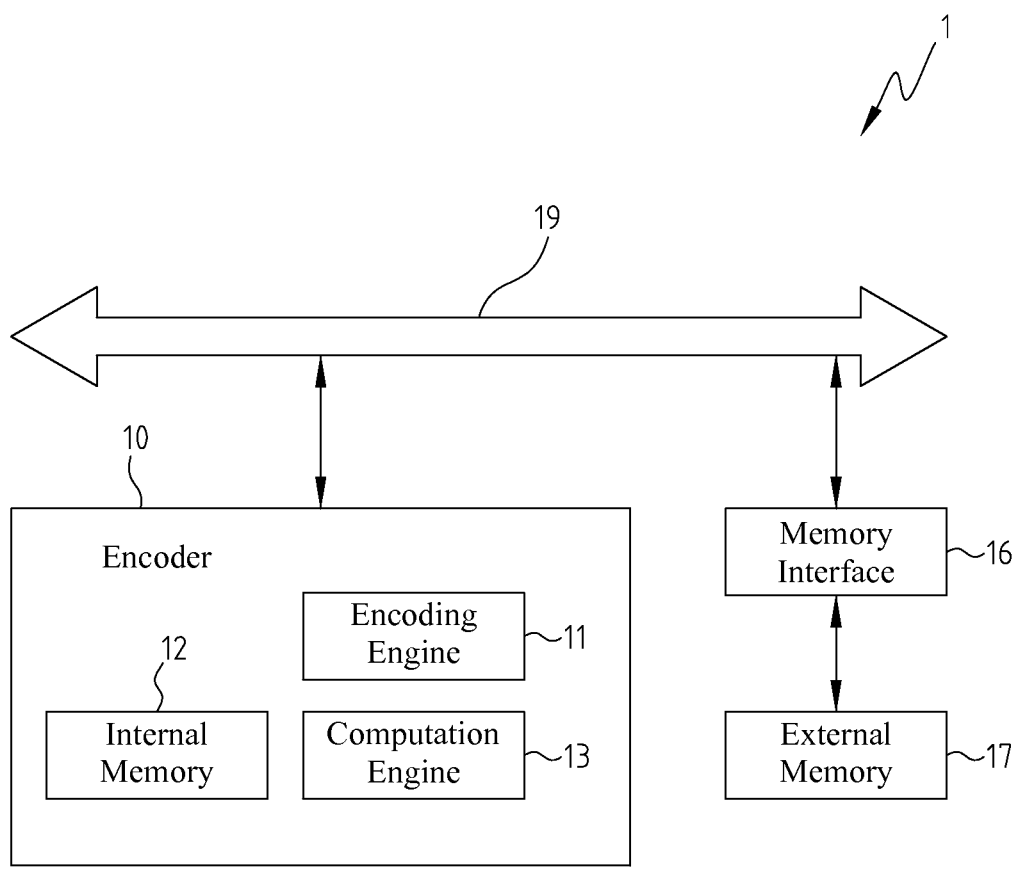
FIG. 1 is a schematic diagram illustrating a conventional video coding hardware system.
Figure 2:
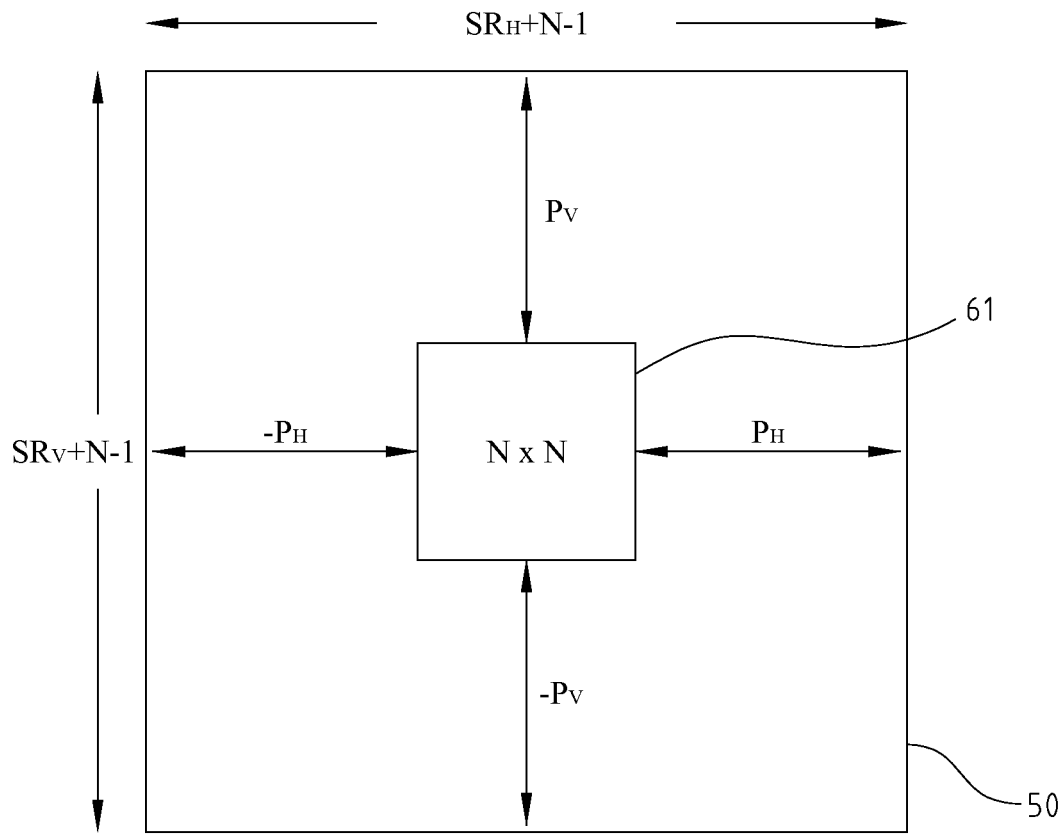
FIG. 2 is a schematic diagram illustrating the search window of the conventional BMA.
Figure 3:
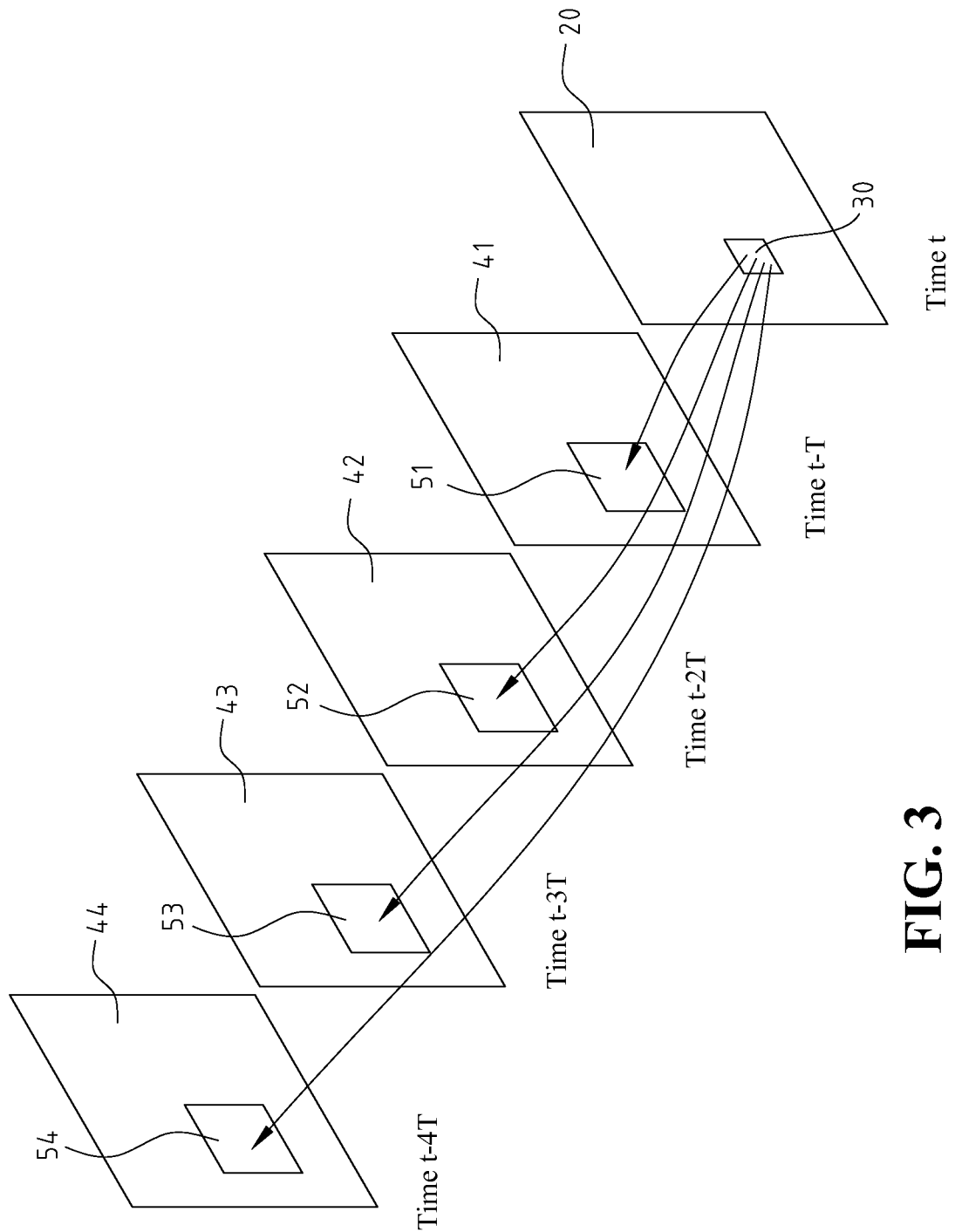
FIG. 3 is a schematic diagram illustrating a conventional multiple reference frames scheme.
Figure 4:
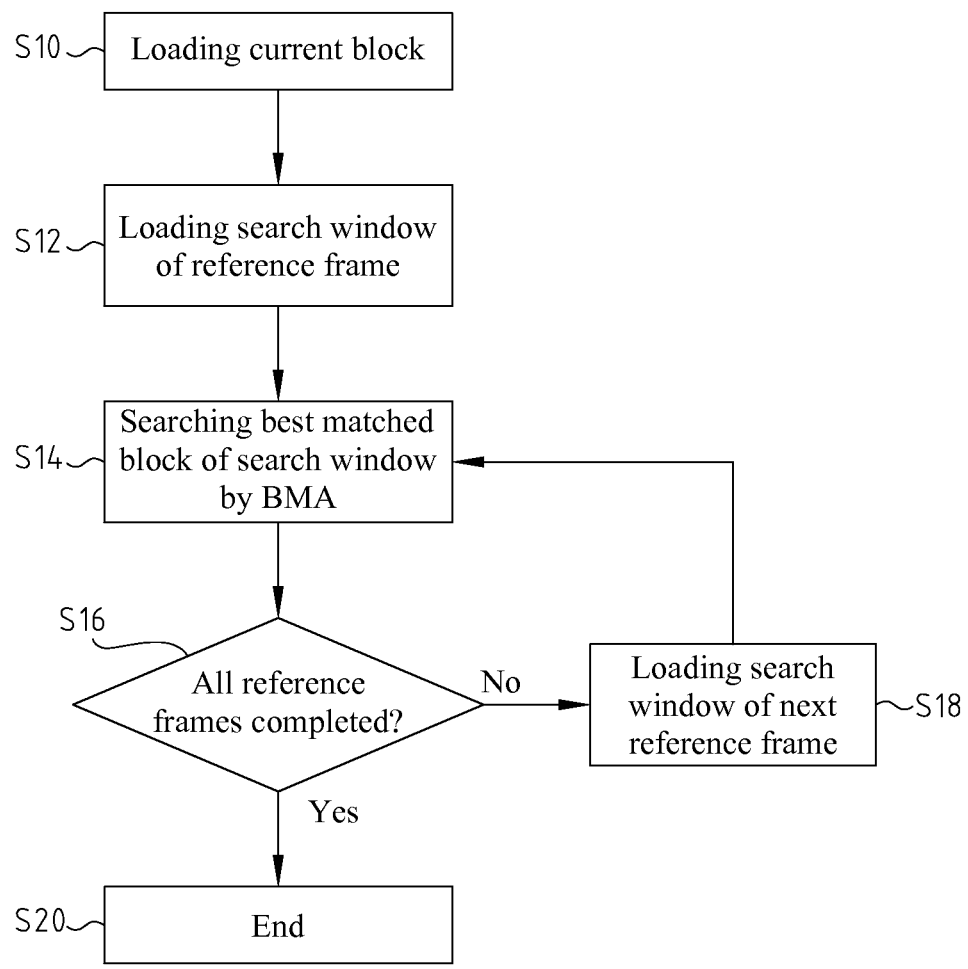
FIG. 4 is a flow chart illustrating the conventional multiple reference frames scheme.

Comparing with the present invention, the conventional technology as shown in FIG. 3 differs in that it requires to load four search windows and the data of a current block for carrying out the motion estimation. On the contrary, the present invention requires to load only one search window and data of four current blocks. Since the data amount of a search window is much more than the data amount of a current block, the present invention is adapted for drastically reducing the data transmission bandwidth. For example, supposing that a data amount of a search window is 3×3 times of a current block, the data amount processed by the conventional technology is 37 times of the current block, i.e., 9×4+1=37, while the data amount processed by the present invention is 13 times of the current block, i.e., 9+1×4=13. As such, according to the present invention, the data transmission bandwidth can be reduced up to $13/37$ (about 35%) of the conventional technology. Therefore, about 65% of the data transmission bandwidth can be saved. Correspondingly, the power consumption of the battery can be decrease, and the battery can thus maintain the power supply for a longer time.

It should be noted that, although four current blocks are exemplified for sharing the same search window in the current embodiment, the scope of the present invention is not restricted by quantity of the exemplified current blocks. In other words, the present invention can select N current blocks for sharing the same search window, in which N is a positive integer.

Figure 7:
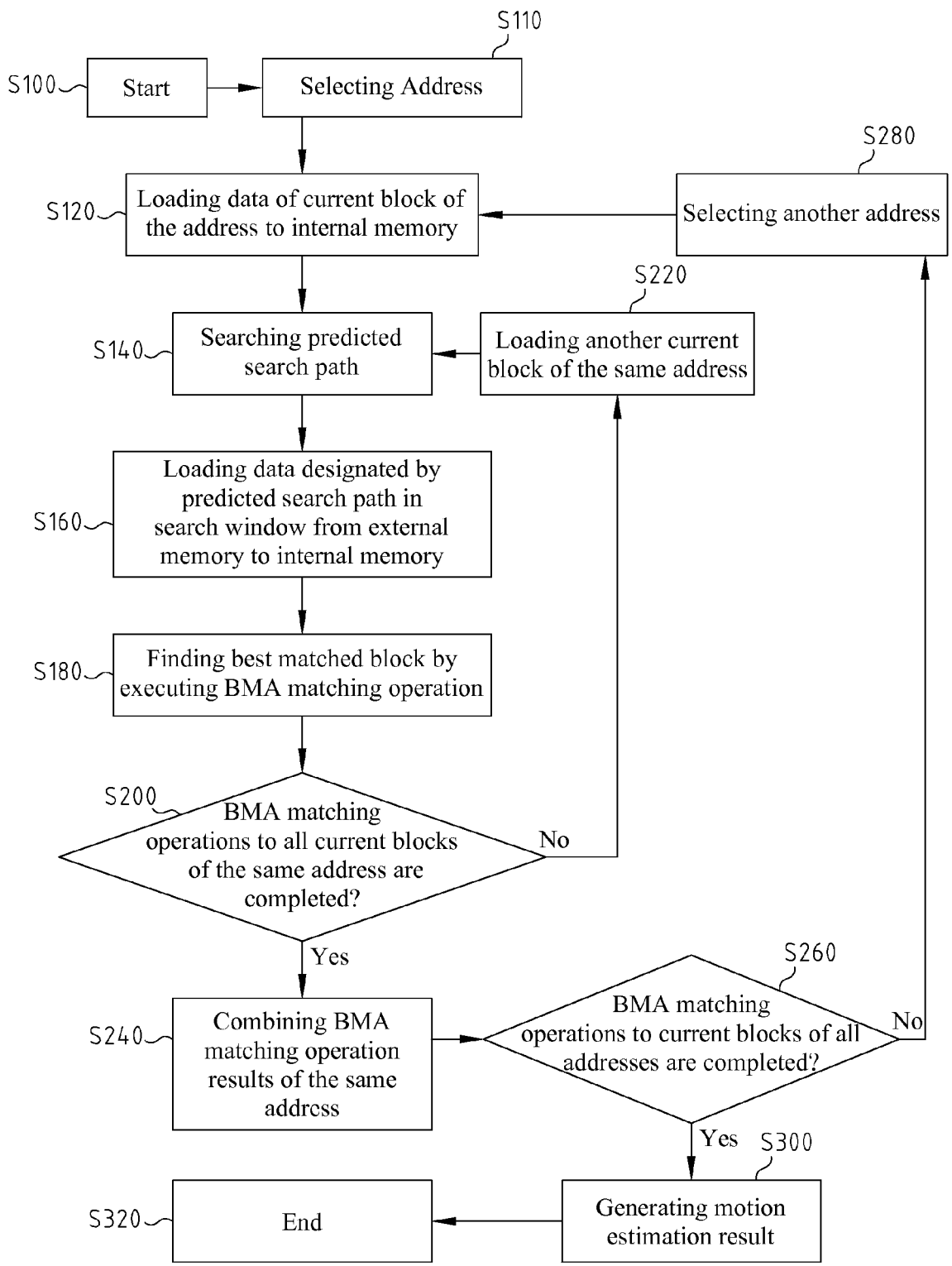
FIG. 7 is a flow chart illustrating the high-performance block-matching VLSI architecture according to an embodiment of the present invention.

FIG. 7 is a flow chart illustrating the high-performance block-matching VLSI architecture according to an embodiment of the present invention. Referring to FIG. 7, at step S100, the motion estimation is started, in which the search window and the current blocks are saved in the external memory 84. At step S110, a current block address of a current frame is selected. Then, at step S120, data of the current block of the current block address is loaded to the internal memory 74. Then, at step S140, a predicated search path is obtained. Then, at step S160, data designated according to the predicated search path is loaded from the external memory 84 to the internal memory 74. Then at step S180, a BMA matching operation is executed to find out a best matched block. Then, at step S200, it is determined whether the BMA matching operation has been executed to all of the current blocks having the same address. If no, then the flow goes to step S220, or otherwise if yes, then the flow goes to step S240. At step S220, another current bock having the same address is loaded, and the flow goes back to step S140, and the steps from S160 to S200 are repeated. At step S240, according to the BMA matching operation result of the same address, the motion estimation of the current blocks at the same spatial address is completed. Then, at step S260, it is determined whether BMA matching operations of current blocks of all spatial addresses have been completed. If no, then the flow goes to step S280, or otherwise if yes, then the flow goes to step S300. At step S280, another address is selected, and the flow goes back to step S120, and the steps S140 to S260 are repeated. At step S300, the motion estimation result is obtained. Then, at step S320, the motion estimation operation is completed.

As such, prior to the BMA matching operation, the present invention searches a more suitable predicated search path, i.e., updates the predicated search path, when loading a next current block.

Figures 8, 9:
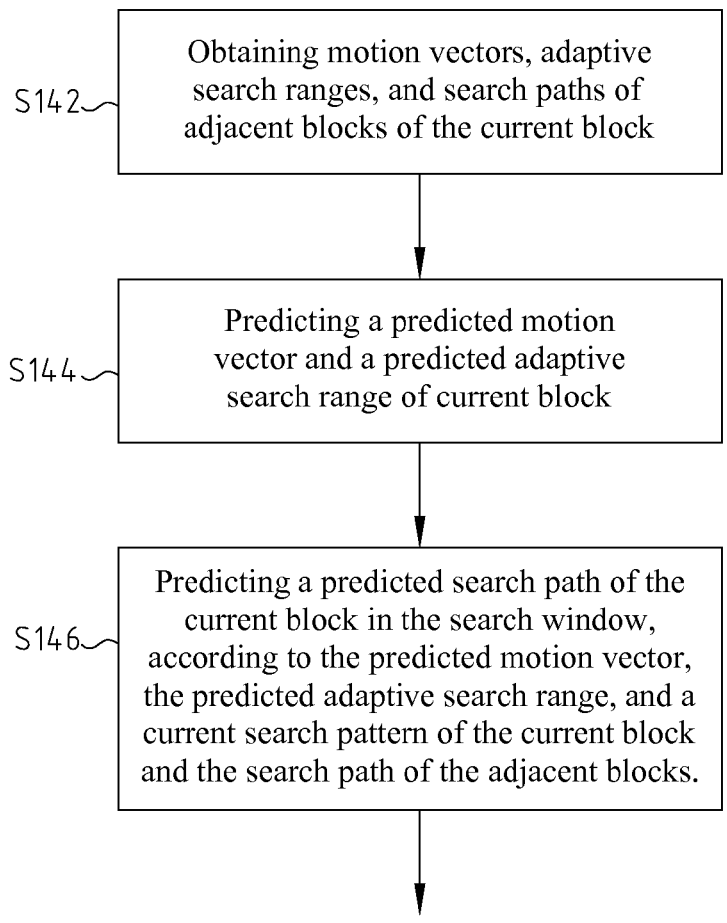
FIG. 8 is a flow chart illustrating a process of predicating the search path of the high-performance block-matching VLSI architecture according to an embodiment of the present invention.
FIG. 9 is a flow chart illustrating a process of predicating the motion vectors of the high-performance block-matching VLSI architecture according to an embodiment of the present invention.

FIG. 8 is a flow chart illustrating a process of predicating the search path of the high-performance block-matching VLSI architecture according to an embodiment of the present invention. The flow chart of the process of predicating the search path of FIG. 8 depicts the details of step S140 of FIG. 7. Referring to FIG. 8, first at step S142, motion vectors, adaptive search ranges and a search path of adjacent blocks of the current block are obtained according to the H.264/AVC video coding standard. Then, at step S144, a motion vector and an adaptive search range of the current block are predicted. Then, at step S146, a search path of the current block is predicted, according to the predicted motion vector, the predicted adaptive search range, the current search pattern, and the search path of the adjacent blocks of the current block.

FIG. 9 is a flow chart illustrating a process of predicating the motion vectors of the high-performance block-matching VLSI architecture according to an embodiment of the present invention. FIG. 9 is provided for further illustrating steps S144 and S146 of FIG. 8. Referring to FIG. 9, a first adjacent block 30A, a second adjacent block 30B, a third adjacent block 30C are adjacently positioned at a left side, an upper left side, and an upper side of a current block 30. The first adjacent block 30A, the second adjacent block 30B, and the third adjacent block 30C have motion vectors MV1, MV2, and MV3, respectively. According to an aspect of the current embodiment, a predicted motion vector MVP of the current block 30 can be determined by averaging the motion vectors MV1, MV2, and MV3. Further, according to another aspect of the current embodiment, the predicted motion vector MVP of the current block 30 can be determined by executing an extrapolation calculation upon a motion vector plane constructed according to the motion vectors MV1, MV2, and MV3. It should be noted that the present invention the above mentioned aspects of the current embodiment are exemplified for illustration purpose without restricting the scope of the present invention.

The predicted adaptive search range for example can be a maximum value of the adaptive search ranges of the adjacent blocks, or an average of the of the adaptive search ranges of the adjacent blocks.

Figure 10:
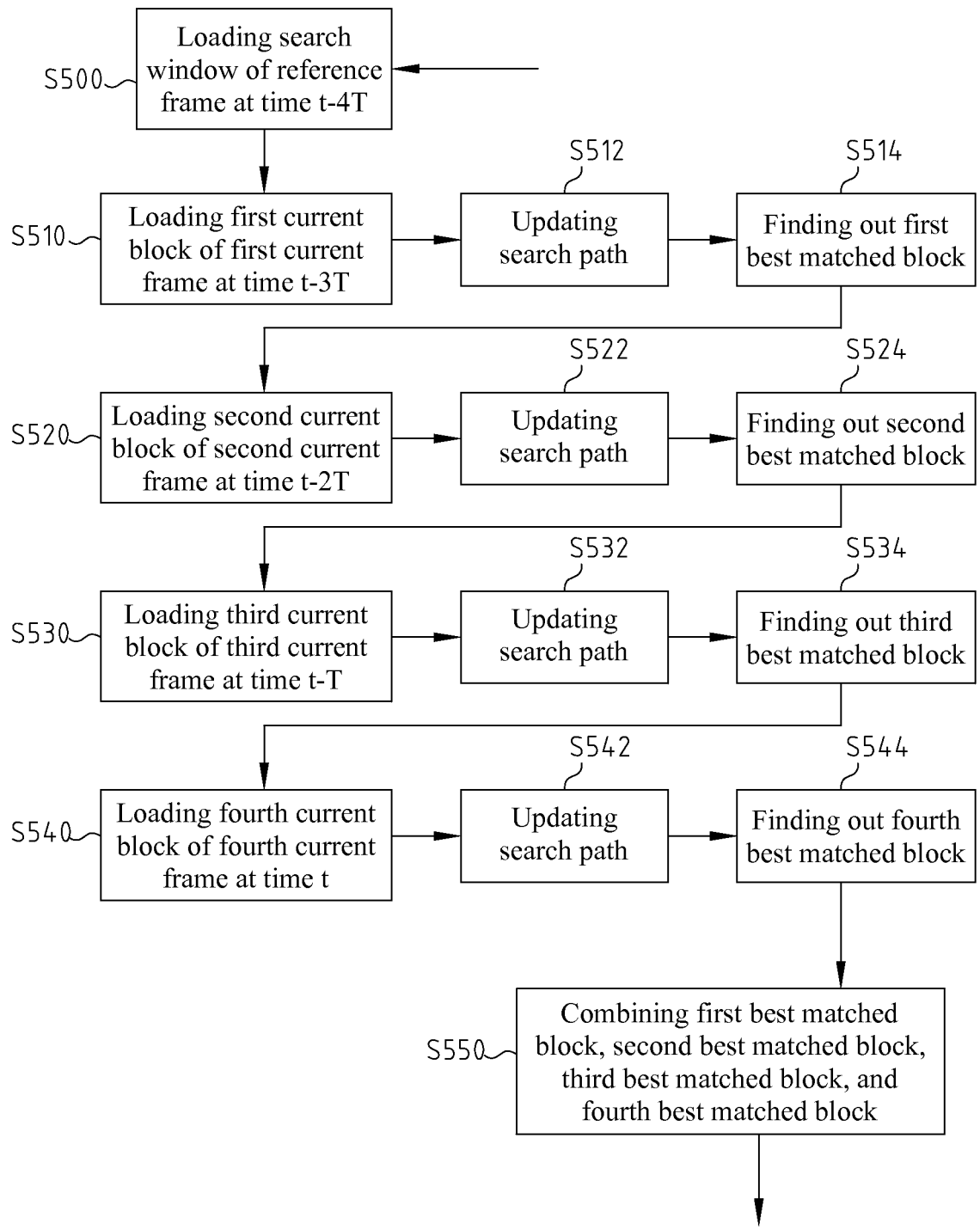
FIG. 10 is another flow chart illustrating a high-performance block-matching VLSI architecture according to an embodiment of the present invention.

FIG. 10 is another flow chart illustrating a high-performance block-matching VLSI architecture according to an embodiment of the present invention. FIG. 10 is provided for further illustrating steps S120 to S240 of FIG. 7, facilitated with FIG. 6.

Referring to FIG. 10, at step S500, a search path of the reference frame at the time t−4T is loaded. Then, at step S510, the first current block of the first current frame at the time t−3T is loaded. Then, at step S512, the search path is updated, i.e., at step S140 of FIG. 7 in which the search path is predicted. Then, at step S514, a first best matched block is found out. Then, at step S520, the second current block of the second current frame at the time t–2T is loaded. Then, at step S522, the search path is updated, i.e., at step S140 of FIG. 7 in which the search path is predicted. Then, at step S524, a second best matched block is found out. Then, at step S530, the third current block of the third frame at the time t–T is loaded. Then, at step S532, the search path is updated, i.e., at step S140 of FIG. 7 in which the search path is predicted. Then, at step S534, a third best matched block is found out. Then, at step S540, the fourth current block of the fourth current frame is loaded. Then, at step S542, the search path is updated, i.e., at step S140 of FIG. 7 in which the search path is predicted. The, at step S544, a fourth best matched block is found out. Then, at step S550, the first best matched block, the second best matched block, the third best matched block, and the fourth best matched block are combined. As such, according to the present invention, best matched blocks and motion vectors corresponding to four current blocks having the same address are searched, so as to improve the reusability of the data, and drastically reduce the power consumed upon the overall motion estimation operation, and improve the operation speed and the performance thereof.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A high-performance block-matching Very-Large-Scale Integration (VLSI) architecture, for executing a motion estimation of an coding operation with low memory bandwidth, for a power-efficient multimedia device, the high-performance block-matching VLSI architecture comprising:
   an external memory, for saving data of a search window of a reference frame;
   a motion estimation hardware processor, for finding out a plurality of corresponding best matched blocks and a plurality of corresponding motion vectors of a plurality of current blocks of different time frames of a same address from the search window according to a best matching algorithm (BMA); and
   a data bus, coupled to the external memory and the motion estimation processor for transmitting data,
   wherein the motion estimation processor comprises an internal memory, a memory processing block, an address selection processing block, a predicting search path processing block, a BMA processing block, and a motion estimation result processing block,
   wherein the memory processing block controls a data access operation between the internal memory and the external memory at least by loading at the same time data of a plurality of different current blocks at the same address comprising blocks of time frame t–n*T, and the search window is in the reference frame, wherein n are all positive integers between and including 0 and m, t is the time of a current block, and T is the interval between two frames;
   the address selection processing block selects a current block address in a current frame;
   the predicting search path processing block executes a prediction of a search path regarding the plurality of current blocks according to the current block address selected by the address selection processing block, so as to predict the search path corresponding to the plurality of current blocks in the search window, wherein motion vectors, adaptive search ranges, and search paths of a plurality of adjacent blocks of the current block are obtained, a predicted motion vector and a predicted adaptive search range of the current block are predicted, and the predicted search path in the search window is predicted according to the predicted motion vector, the predicted adaptive search range, and a current search pattern of the current block and the search path of the adjacent blocks;
   the BMA processing block loads only data designated by the predicted search path of the search window of the reference frame t–m*T–T from the external memory to the internal memory, and finds out the best matched blocks and the motion vectors by the BMA, according to the search path predicted by the predicting search path processing block, wherein data designated by the predicted search path is less than data of the search window, m is a positive integer greater than zero and is the maximum number of frames used for motion estimation minus 1; and
   the motion estimation result processing block recording the motion vectors of the plurality of current blocks and the best matched blocks.

2. The high-performance block-matching VLSI architecture according to claim 1, wherein the BMA determines a minimum value of a sum of absolute differences (SAD) as the best matched block, the SAD being defined by the equation of $$SAD(i, j) = \sum_{m=0}^{15} \sum_{n=0}^{15} |X(m, n) - Y(m + i, n + j)|$$

wherein X(m, n) represents an image data of the current block at coordinates (m,n), Y(m+i, n+j) represents the image data of a reference block at coordinates (m+i, n+j), wherein i is a horizontal coordinate, and j is a vertical coordinate, and i and j are integers.

3. The high-performance block-matching VLSI architecture according to claim 1, wherein each of the motion vectors is a vector directed from an address of current block to an address of the corresponding best matched block.

4. A high-performance block-matching method for a Very-Large-Scale Integration (VLSI) architecture, for executing a motion estimation of an coding operation with low memory bandwidth, for a power-efficient multimedia device, the high-performance block-matching method comprising:
   performing by one or more processors:
   step A: starting the motion estimation, wherein data to be searched comprises data of a search window of a reference frame and data of a plurality of current blocks of different consecutive time frames of a same block address are saved in an external memory, then entering step B, wherein the plurality of current blocks comprise a block of each time frame t–n*T, and the search window of the reference frame is at time t–m*T–T, wherein n are all positive integers between and including 0 and m, t is the time of a current block at time t, T is the interval between two frames, and m is a positive integer greater than zero and is the maximum number of frames used for motion estimation minus 1;
   step B: selecting an address of the current blocks, then entering step C;
   step C: loading the data of one current block corresponding to the address of the current block to an internal memory, then entering step D;

step D: finding out a predicted search path, then entering step E, wherein the step D further comprises:
  obtaining motion vectors, adaptive search ranges, and search paths of a plurality of adjacent blocks of the current block;
  predicting to obtain a predicted motion vector and a predicted adaptive search range of the current block; and
  predicting to obtain the predicted search path in the search window, according to the predicted motion vector, the predicted adaptive search range, and a current search pattern of the current block and the search path of the adjacent blocks;
step E: loading only data designated by the predicted search path in the search window from the external memory to the internal memory, wherein only data designated by the predicted search path is less than data of the search window, then entering step F;
step F: executing a best matching algorithm (BMA) matching operation according to a BMA to find out a best matched block according to the data designated by the predicted search path, then entering step G;
step G: determining if the BMA matching operation has been executed to all of the current blocks having the same block address, then entering step I, else entering step H;
step H: loading another current block having the address, and returning back to step D;
step I: completing the motion estimation of the current blocks having the address, according to the BMA matching operation result of the same address, then entering step J;
step J: determining whether BMA matching operations of current blocks of all current block addresses have been completed, then entering step L, else entering step K;
step K: selecting another current block address, and returning back to step C;
step L: generating a motion estimation result, then entering step M; and
step M: completing the motion estimation.

5. The high-performance block-matching method according to claim 4, wherein the BMA determines a minimum value of a sum of absolute differences (SAD) as the best matched block, the SAD being defined by the equation of $$SAD(i, j) = \sum_{m=0}^{15} \sum_{n=0}^{15} |X(m, n) - Y(m+i, n+j)|$$

wherein X(m, n) represents an image data of the current block at coordinates (m,n), Y(m+i, n+j) represents the image data of a reference block at coordinates (m+i, n+j), wherein i is a horizontal coordinate, and j is a vertical coordinate, and i and j are integers.

6. The high-performance block-matching method according to claim 4, wherein each of the motion vectors is a vector directed from an address of the current block to an address of the corresponding best matched block.

7. The high-performance block-matching method according to claim 4, wherein the predicted adaptive search range is a maximum one of the adaptive search ranges of the adjacent blocks, or an average of the adaptive search ranges of the adjacent blocks.

8. The high-performance block-matching method according to claim 4, wherein the adjacent blocks are blocks adjacently positioned at a left side, an upper left side, and an upper side of the current block.

9. The high-performance block-matching method according to claim 4, wherein the predicted motion vector of the current block is positioned on a motion vector plane defined by the motion vectors of the adjacent blocks, and is determined by executing an extrapolation calculation.

10. The high-performance block-matching method according to claim 4, wherein the predicted motion vector is an average of the motion vectors of the adjacent blocks.

* * * * *